US012143792B2

(12) United States Patent
Hui et al.

(10) Patent No.: US 12,143,792 B2
(45) Date of Patent: Nov. 12, 2024

(54) MICRO SPEAKER

(71) Applicant: AAC Microtech (Changzhou) Co., Ltd., Changzhou (CN)

(72) Inventors: Yao Hui, Shenzhen (CN); Xingchi Chen, Shenzhen (CN); Weimin Chen, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 119 days.

(21) Appl. No.: 17/880,698

(22) Filed: Aug. 4, 2022

(65) Prior Publication Data

US 2023/0209272 A1 Jun. 29, 2023

(51) Int. Cl.
*H04R 9/02* (2006.01)

(52) U.S. Cl.
CPC .......... *H04R 9/025* (2013.01); *H04R 2400/11* (2013.01)

(58) Field of Classification Search
CPC ............................ H04R 9/025; H04R 2400/11
See application file for complete search history.

(56) References Cited

FOREIGN PATENT DOCUMENTS

| | | | | |
|---|---|---|---|---|
| CN | 209390350 U | * | 9/2019 | |
| CN | 214101769 U | * | 8/2021 | ............ H04R 9/025 |

* cited by examiner

*Primary Examiner* — Sunita Joshi
(74) *Attorney, Agent, or Firm* — W&G Law Group

(57) ABSTRACT

The present invention provides a micro speaker, including a frame with a containment space, and a magnetic circuit system and a vibration system contained in the containment space. The vibration system includes a first diaphragm, a circuit board, a skeleton, and a voice coil. The micro speaker further includes a welding plate structure and a balance component. The voice coil includes a lead wire electrically connected with the welding plate structure. By setting the balance component on the skeleton, the present invention can keep the weight balance at both ends of the skeleton, so as to ensure that the skeleton will not sway when the vibration system is working, so that the vibration of the skeleton is stable and the sound quality is improved.

9 Claims, 4 Drawing Sheets

MICRO SPEAKER

FIELD OF THE PRESENT DISCLOSURE

The present invention relates to the field of electroacoustic transducers, especially to a micro speaker.

DESCRIPTION OF RELATED ART

With the rapid development of mobile communication technology in recent years, consumers are increasingly using mobile communication equipment with voice functions, such as: portable phones, handheld game consoles and laptop computers, etc. The micro speaker is used as a voice playback device, and its design directly affects the voice performance of mobile communication equipment products of related technologies.

In the related art, the micro speaker includes a frame, a magnetic circuit system and a vibration system accommodated in the frame, and. the vibration system includes a skeleton, a vibration diaphragm, and a voice coil that drives the vibration diaphragm to vibrate and produce sound. The skeleton is provided with a welding plate structure, and the welding plate structure is set at one end of the skeleton. The welding plate structure includes a welding plate, a welding ball, and a lead wire, and the weights of the welding plate, welding ball, and lead wire participate in the speaker vibration. The weights on both sides of the micro speaker are unbalanced, and the unbalanced weights will cause the single body to swing. Thereby causing adverse consequences such as wiping ring, affecting the sound quality of the product.

Therefore, it is necessary to provide a micro speaker to solve the above technical problems.

SUMMARY OF THE PRESENT INVENTION

The main purpose of the present invention is to provide a micro speaker, which is used to solve the technical problem of the single-body swing phenomenon caused by the welding plate structure being arranged on one side of the skeleton in the related art.

Accordingly, the present invention provides a micro speaker, comprising: a frame with a containment space; a magnetic circuit system contained in the containment space; a vibration system contained in the containment space, including a first diaphragm located on one side of the frame, a circuit board attached to the frame and arranged on a side of the first diaphragm close to the magnetic circuit system, a skeleton connected between the first diaphragm and the circuit board, and a voice coil fixed to a side of the skeleton close to the magnetic circuit system for driving the skeleton to vibrate; a welding plate structure; and a balance component fixed to one side of the skeleton where the voice coil is located, for balancing the weight of the welding plate structure and the lead wire. The welding plate structure and the balance component are respectively located on opposite sides of the voice coil, and the voice coil includes a lead wire that is electrically connected to the welding plate structure.

In addition, the skeleton includes a bottom plate connected to the first diaphragm, and two side walls bending extending from the opposite edges of the bottom plate to the magnetic circuit system; an end of the side wall away from the bottom plate is fixedly connected to the circuit board; the voice coil is fixed on the bottom plate near the plate surface of the magnetic circuit system; the welding plate structure is fixed on the bottom plate with the plate surface of the voice coil and is located between a side wall and the voice coil; the balance component is fixed to the other side wall.

In addition, the circuit board includes two sub-circuit boards located on opposite sides of the voice coil; one end of the sub-circuit boards is connected to the basic frame, the other end is connected to the corresponding end of the side wall away from the bottom plate.

In addition, the balance component is disposed on one side of the side wall close to the voice coil.

In addition, the balance component is disposed on the side of the side wall away from the voice coil.

In addition, the balance component is arranged on the side wall near the sub-circuit board, or the balance component is arranged on the side wall near the sub-circuit board at the bottom plate, or the balance component covers the side surface of the side wall.

In addition, the welding plate structure includes a guide plate fixed to the corresponding sub-circuit board, a welding plate fixed on the plate surface of the bottom plate and connected with the guide plate, and a welding ball fixed on the welding plate and electrically connected with the lead wire.

In addition, the skeleton is arranged symmetrically, and the balance component and the welding plate structure are arranged symmetrically with the symmetrical axis of the skeleton; a weight of the balance component is equal to a sum of the weights of the welding plate structure and the lead wire.

In addition, a material of the balance component includes sticky material or metal welding material.

In addition, the magnetic circuit system includes a first magnet having a containment groove and accommodated in the containment space, a second magnet fixed to the first magnet and located in the containment groove, and a magnetic gap formed between the second magnet and the first magnet for at least partially receiving the voice coil.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Figure 1:
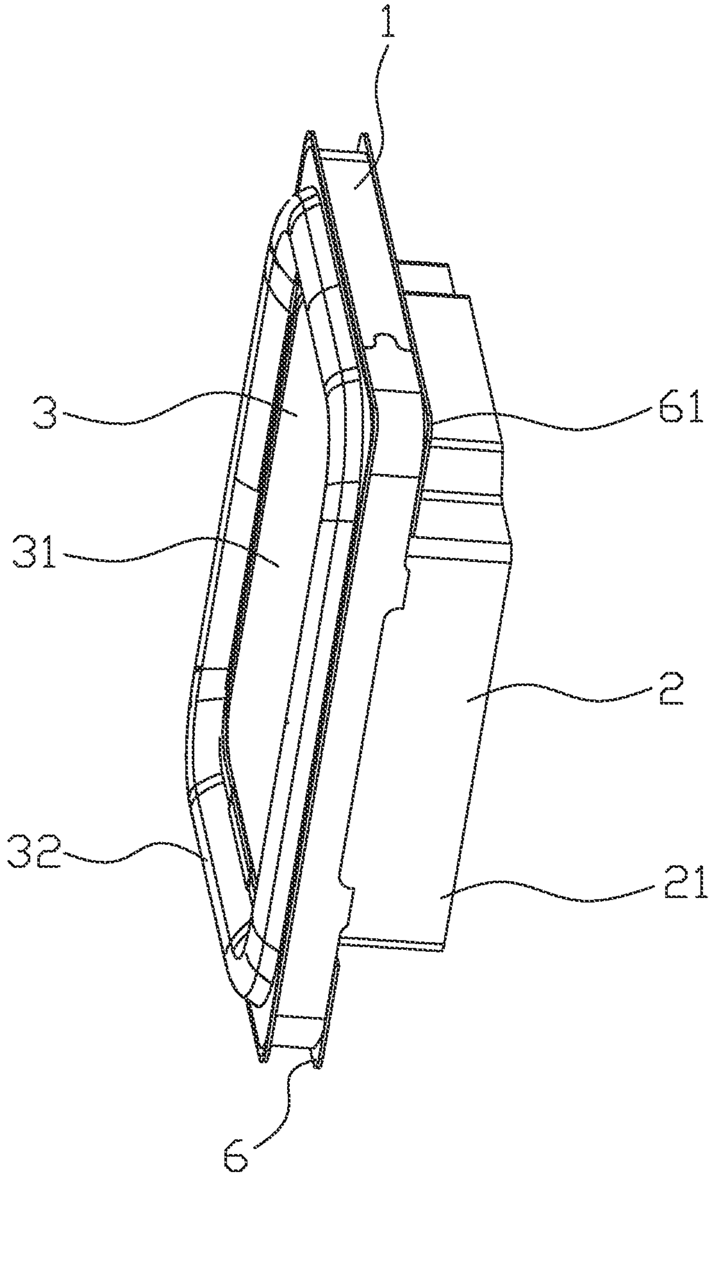
FIG. 1 is an isometric view of a micro speaker in accordance with an exemplary embodiment of the present invention.
Figure 2:
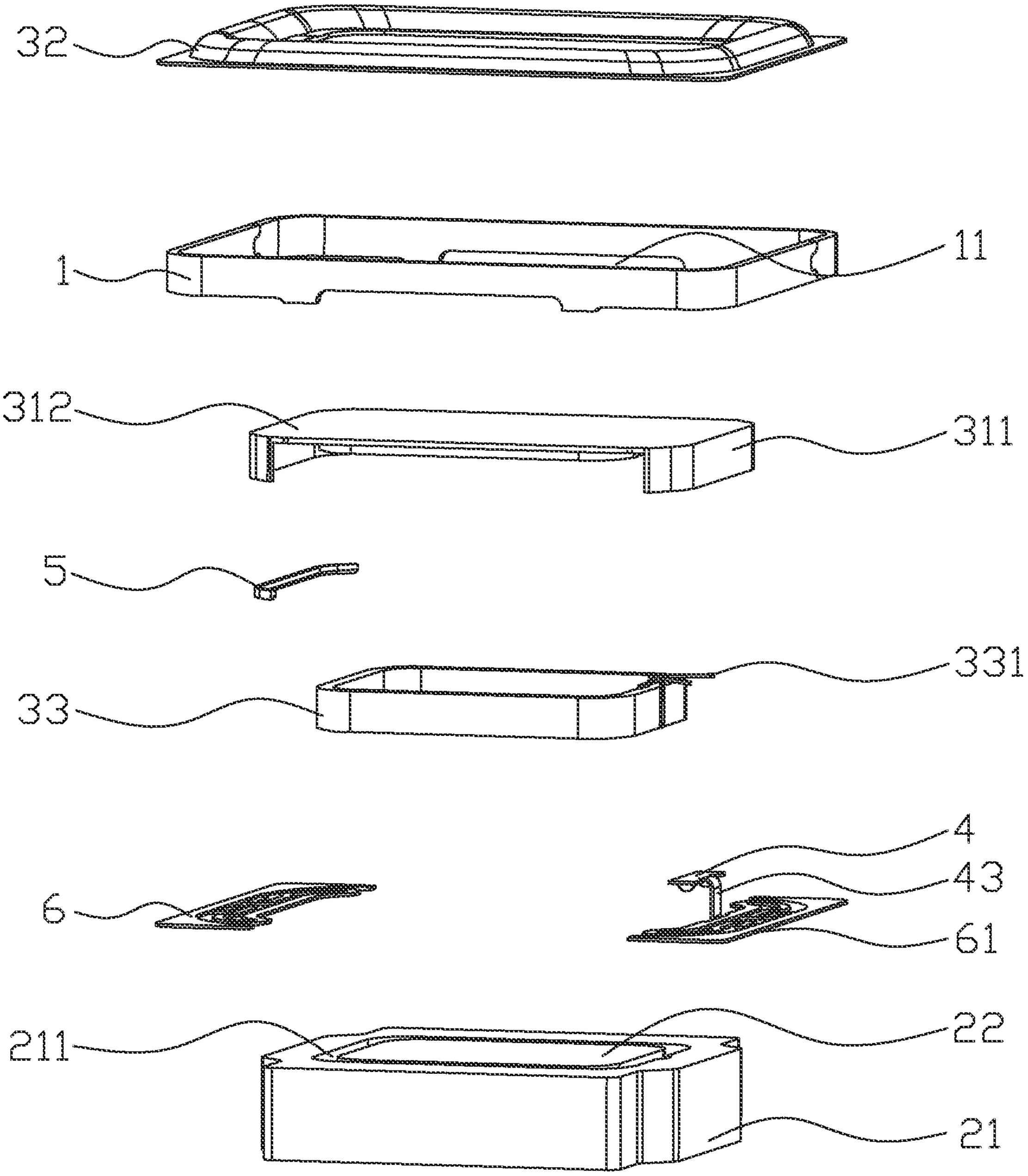
FIG. 2 is an isometric and exploded view of the micro speaker in FIG. 1.
Figure 3:
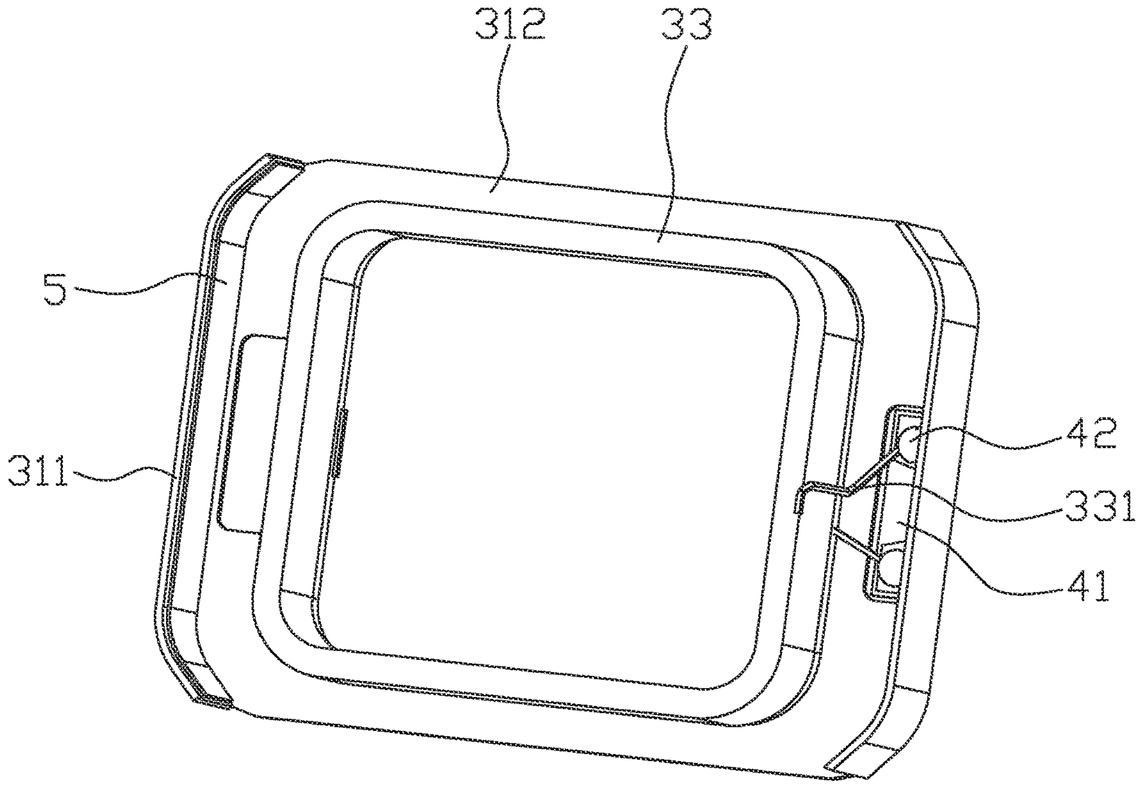
FIG. 3 is an isometric view of an assembly of a skeleton, voice coil, and a balance component of the micro speaker in FIG. 1, in accordance with a first implementation.

Referring to FIGS. 1-3, in this embodiment, a micro speaker includes a frame 1 with a containment space 11 and a magnetic circuit system 2 and a vibration system 3 contained in the containment space 11. The system 3 includes a first diaphragm 32 provided on the side of the frame 1, a circuit board 6 provided on the frame 1 and located on the side of the first diaphragm 32 close to the magnetic circuit system 2, a skeleton 31 connected between the first diaphragm 32 and the circuit board 6, and a voice coil 33 fixed to the side of the skeleton 31 close to the magnetic circuit system 2 for driving the skeleton to vibrate. The micro speaker further includes a welding plate structure 4 and a balance component 5 fixed to the side of the skeleton 31 where the voice coil 33 is provided. The welding plate structure 4 and the balance component 5 are located on opposite sides of the voice coil 33, respectively. The voice coil 33 includes a lead wire of the voice coil 331 electrically connected to the welding plate structure 4. The balance component 5 is used to balance the weight of the welding plate structure 4 and the lead wire of the voice coil 331.

Specifically, the cross section of the frame 1 is a rectangular shape, the containment space 11 can be a rectangular through hole, and a gap is arranged between the skeleton 31 and the frame 1. It is beneficial for skeleton 31 to vibrate relative to frame 1. Welding plate structure 4 and balance component 5 are respectively arranged at both ends of skeleton 31, which is understandable. By arranging the balance component 5 on the skeleton 31, the end of the skeleton 31 where the balance component 5 is arranged and the end of the skeleton 31 where the welding plate structure 4 is arranged maintain the weight balance. So as to ensure that when the vibration system 3 is working, the skeleton 31 will not sway. The vibration of the skeleton 31 is stabilized, thereby improving the sound quality of the micro speaker.

Please refer to FIGS. 1-3. The skeleton 31 includes a bottom plate 312 connected with the first diaphragm 32 and two side walls 311 bending and extending from the opposite edges of the bottom plate 312 to the magnetic circuit system 2. side wall 311 away from the bottom plate 312 is fixedly connected to the circuit board 6. The voice coil 33 is fixed to the bottom plate 312 near the plate surface of the magnetic circuit system 2.

The welding plate structure 4 is fixed on the bottom plate 312 with the plate surface of the voice coil 33 and is located between a side wall 311 and the voice coil 33. The balance component 5 is fixed to the other side wall 311. Specifically, the bottom plate 312 can be a rectangular plate, the cross section of the voice coil 33 is in a rectangular shape, and the side wall 311 is vertically fixed to the plate surface of the bottom plate 312. And the side wall 311 is adapted to the side edge of the corresponding bottom plate 312.

The end of the side wall 311 away from the bottom plate 312 is flush with the end of the voice coil 33 away from the bottom plate 312, which is beneficial to realize the close attachment of the skeleton 31 and the magnetic system. When the voice coil 33 drives the skeleton 31 to vibrate, since the first diaphragm 32 is connected to the skeleton 31, the skeleton 31 will drive the first diaphragm 32 to vibrate to realize the sound of the micro speaker. It can be understood that the end of the skeleton 31 provided with the balance component 5 maintains the weight balance with the end of the skeleton 31 provided with the welding plate structure 4 and the lead wire of the voice coil 331. The weights at the left and right ends of the skeleton 31 are balanced, so that the skeleton 31 is uniformly stressed and the vibration is stable during the vibration process, so that the skeleton 31 will not sway.

The circuit board 6 includes two sub-circuit boards 61 located on opposite sides of the voice coil 33, and one end of the sub-circuit board 61 is connected to the frame 1. The other end is connected to the end of the corresponding side wall 311 away from the bottom plate 312. The welding plate structure 4 includes a guide plate 43 fixed to the corresponding sub-circuit board 61, a welding plate 41 fixed to the plate surface of the bottom plate 312 and connected to the guide plate 43, and a welding ball 42 fixed to the welding plate 41 and electrically connected to the lead wire 331.

The welding plate 41 is electrically connected to the corresponding sub-circuit board 61. Specifically, the two sub-circuit boards 61 are arranged symmetrically with the center line of the bottom plate 312 as the symmetrical axle, so as to ensure that the overall structure of the vibration system 3 is symmetrical. One end of each side wall 311 away from the bottom plate 312 is connected to the corresponding sub-circuit board 61. The lead wire 331 is electrically connected to the welding ball 42, the welding ball 42 is electrically connected to the welding plate 41, and the welding plate 41 is electrically connected to the sub-circuit board 61 through the guide plate 43. The voice coil 33 is electrically connected to the sub-circuit board 61 to realize the power supply of the voice coil 33.

Preferably, in order to ensure the fixed connection between the magnetic circuit system 2 and the frame 1, the two sub-circuit boards 61 are disposed apart from the magnetic circuit system 2, so that the frame 1 is arranged with enough contact area for being fixed with the magnetic circuit system 2. The two sub-circuit boards 61 are arranged symmetrically with the center line of the bottom plate 312 as the symmetrical axle, which further ensures the symmetry of the overall structure of the vibration system 3.

In this embodiment, according to actual needs, the balance component 5 can either be placed on the side wall 311 close to the voice coil 33, or the balance component 5 can cover the side surface of the side wall 311, or placed on the side wall 311 away from the voice coil 33, or can be placed on the bottom plate 312.

Figure 4:
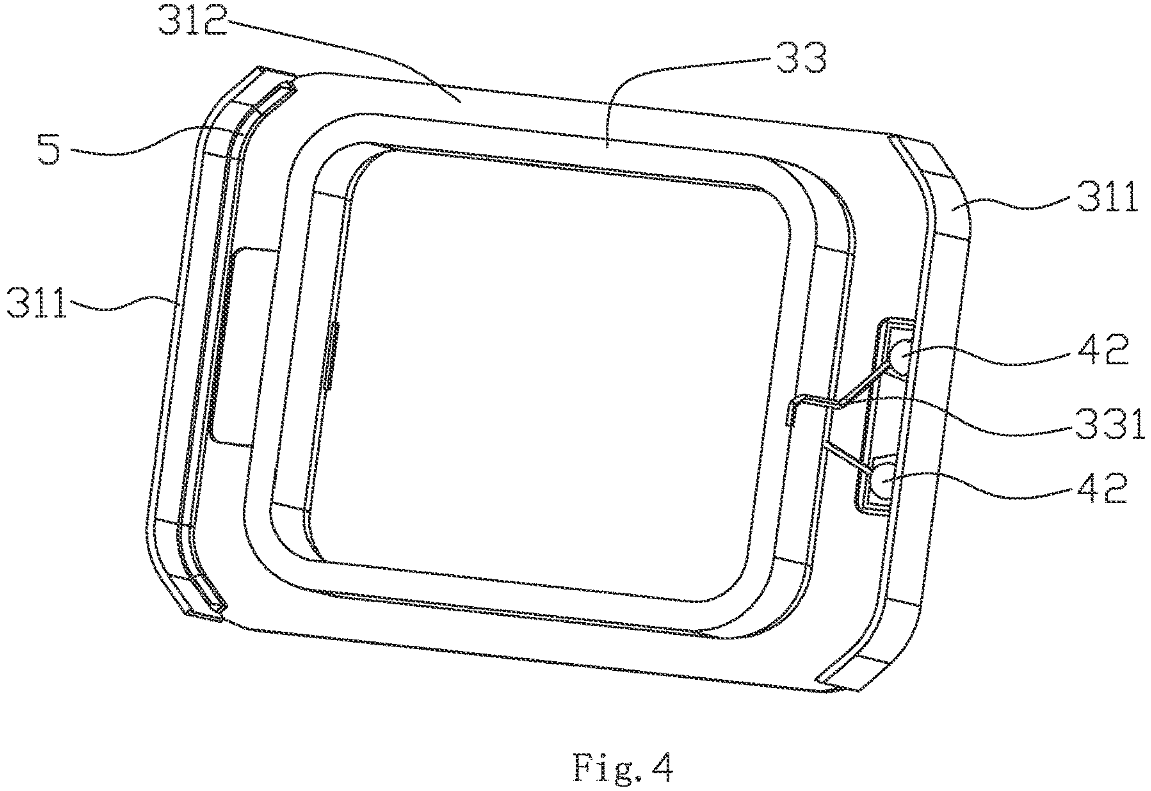
FIG. 4 is an isometric view of an assembly of a skeleton, voice coil, and a balance component of the micro speaker in FIG. 1, in accordance with a second implementation.

Referring to FIGS. 3-4, as an option, the balance component 5 is arranged on the side of the side wall 311 close to the voice coil 33. Specifically, the balance component 5 can be attached to the side wall 311 in a sheet shape. At this time, the balance component 5 covers the side surface of the side wall 311, or it can be fixed on the side wall 311 in a strip shape. At this time, the balance component 5 is arranged on the side wall 311 close to the voice coil 33. place. That is, the shape of the balance component 5 can be set according to actual needs, which facilitates the installation of the balance component 5. Moreover, according to actual needs, the balance component 5 can be arranged between the two side edges of the side wall 311, or can be arranged on one side of the side wall 311. This makes the installation precision of the balance component 5 low, and reduces the installation difficulty of the balance component 5.

Figure 5:
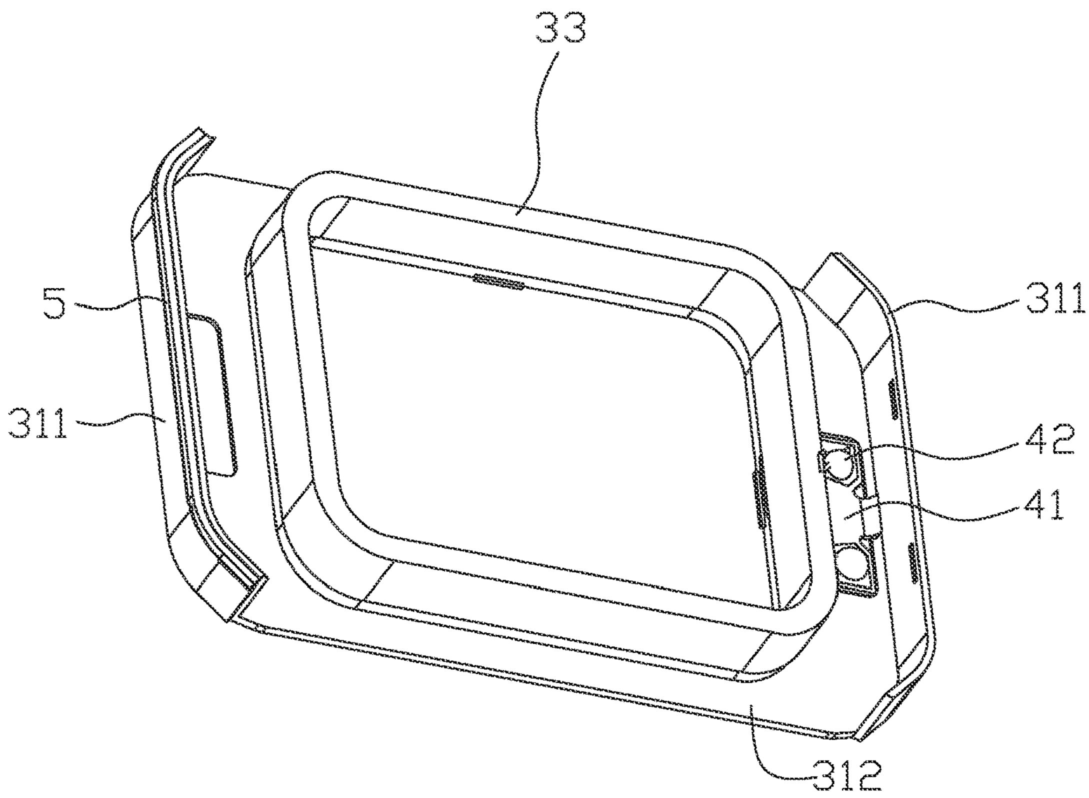
FIG. 5 is an isometric view of an assembly of a skeleton, voice coil, and a balance component of a micro speaker of another embodiment of the present invention, in accordance with a first implementation.
Figure 6:
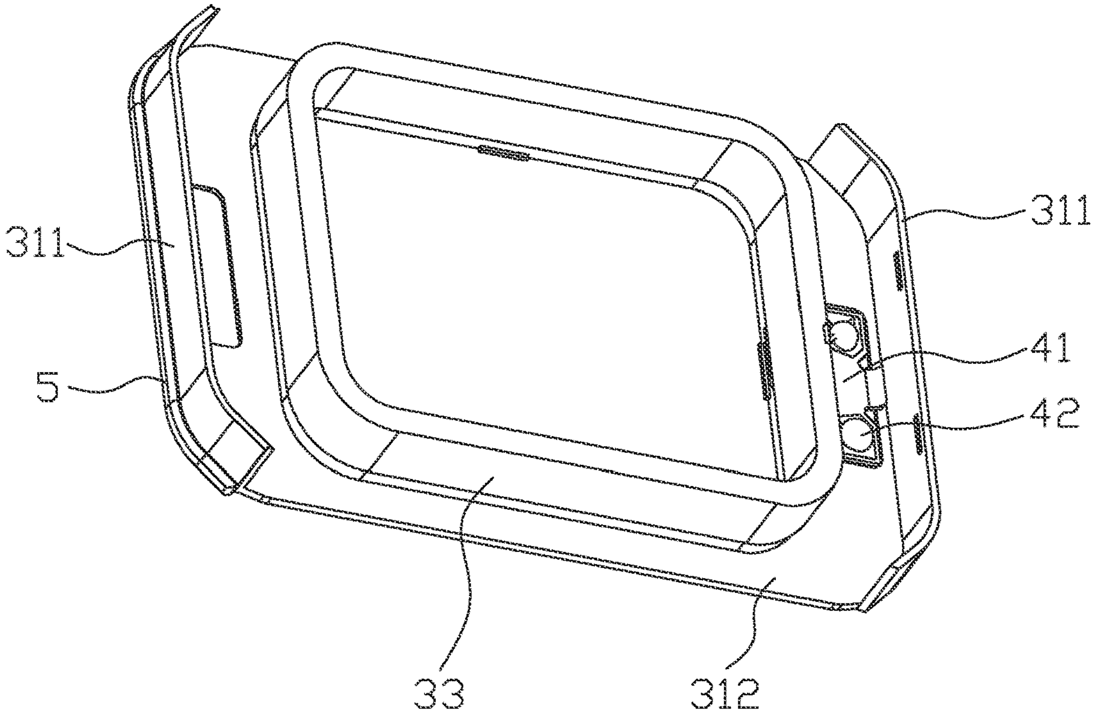
FIG. 6 is an isometric view of an assembly of a skeleton, voice coil, and a balance component of the micro speaker, in accordance with a second implementation.

Referring to FIGS. 5-6, as another option of the embodiment, the balance component 5 is disposed on the side of the side wall 311 away from the voice coil 33. Specifically, the balance component 5 is connected to the sub-circuit boards 61 and the side wall 311 respectively, or the balance component 5 is connected to the bottom plate 312 and the side wall 311 respectively; at this time, the balance component 5 can be in the shape of a strip, and the balance component 5 is provided at the connection between the sub-circuit board 61 and the side wall 311 and the connection between the side wall 311 and the bottom plate 312. The connection strength between the sub-circuit board 61 and the side wall 311 and the connection strength between the side wall 311 and the bottom plate 312 can be strengthened through the balance component 5. In addition, according to actual needs, the balance component 5 can also be arranged between the two side edges of the side wall 311 to facilitate the installation of the balance component 5.

Another option, the skeleton 31 is arranged symmetrically, the balance component 5 and the welding plate structure 4 are arranged symmetrically with the symmetrical axis of the skeleton 31 being the symmetrical axle, and the weight of the balance component 5 is equal to the sum of the weights of the welding plate structure 4 and the lead wire of the voice coil 311.

Specifically, the balance component 5 can be set on the bottom plate 312, when the balance component 5 and the welding plate structure 4 are symmetrically arranged with the symmetrical axis of the skeleton 31 as the symmetrical axle, it is only necessary to ensure that the weight of the balance component 5 is equal to the sum of the weights of the welding plate 41, the welding ball 42 and the lead wire 331. It can be ensured that the end of the skeleton 31 with the balance component 5 and the end of the skeleton 31 with the welding plate structure 4 maintain a weight balance. Avoid the need to calculate the position of the balance component 5, and reduce the installation difficulty of the balance component 5.

Referring back to FIGS. 2 *a*-3, in this embodiment, the material of balance component 5 includes sticky material or metal welding material. Specifically, the sticky material can be cured glue, and the metal welding material can be copper, silver, aluminum, nickel, and the like. When the balance component 5 is a sticky material, the balance component 5 is fixed on the side wall 311 by means of bonding. The installation of balance component 5 is convenient and quick, when balance component 5 is metal welding material. The balance component 5 is fixed on the side wall 311 by brazing welding, and the connection strength between the balance component 5 and the side wall 311 is high.

Referring to FIGS. 1-2, the magnetic circuit system 2 includes a first magnet 21 with a containment groove and contained in the containment space 11, and a second magnet 22 fixed on the first magnet 21 and located in the containment groove. There is a magnetic gap between the second magnet 22 and the first magnet 21, and the voice coil 33 is partially received in the magnetic gap.

Specifically, the first magnet 21 is fixed on the frame 1, the side of the sub-circuit board 61 away from the frame 1 is close to the first magnet 21, and the voice coil 33 is arranged in the magnetic gap between the second magnet 22 and the first magnet 21. When the voice coil 33 is energized, the voice coil 33 will vibrate under the action of the first magnet 21 and the second magnet 22, thereby driving the skeleton 31 to vibrate. Preferably, the shape of the side wall 311 of the first magnet 21 close to the sub-circuit board 61 is adapted to the shape of the side edge of the sub-circuit board 61 abutting against the first magnet 21, which is conducive to maintaining the gap between the sub-circuit board 61 and the first magnet 21.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A micro speaker, comprising:

a frame with a containment space;

a magnetic circuit system contained in the containment space;

a vibration system contained in the containment space, including a first diaphragm located on one side of the frame, a circuit board attached to the frame and arranged on a side of the first diaphragm close to the magnetic circuit system, a skeleton connected between the first diaphragm and the circuit board, and a voice coil fixed to a side of the skeleton close to the magnetic circuit system for driving the skeleton to vibrate;

a welding plate structure;

a balance component fixed to one side of the skeleton where the voice coil is located, for balancing the weight of the welding plate structure and the lead wire; wherein the welding plate structure and the balance component are respectively located on opposite sides of the voice coil, and the voice coil includes a lead wire that is electrically connected to the welding plate structure;

wherein a material of the balance component includes sticky material or metal welding material.

2. The micro speaker as described in claim 1, wherein the skeleton includes a bottom plate connected to the first diaphragm, and two side walls bending extending from the opposite edges of the bottom plate to the magnetic circuit system; an end of the side wall away from the bottom plate is fixedly connected to the circuit board; the voice coil is fixed on the bottom plate near the plate surface of the magnetic circuit system; the welding plate structure is fixed on the bottom plate with the plate surface of the voice coil and is located between a side wall and the voice coil; the balance component is fixed to the other side wall.

3. The micro speaker as described in claim 2, wherein the circuit board includes two sub-circuit boards located on opposite sides of the voice coil; one end of the sub-circuit boards is connected to the basic frame, the other end is connected to the corresponding end of the side wall away from the bottom plate.

4. The micro speaker as described in claim 3, wherein the balance component is disposed on one side of the side wall close to the voice coil.

5. The micro speaker as described in claim 3, wherein the balance component is disposed on the side of the side wall away from the voice coil.

6. The micro speaker as described in claim 4, wherein the balance component is arranged on the side wall near the sub-circuit board, or the balance component is arranged on the side wall near the sub-circuit board at the bottom plate, or the balance component covers the side surface of the side wall.

7. The micro speaker as described in claim 3, wherein the welding plate structure includes a guide plate fixed to the corresponding sub-circuit board, a welding plate fixed on the plate surface of the bottom plate and connected with the guide plate, and a welding ball fixed on the welding plate and electrically connected with the lead wire.

8. The micro speaker as described in claim 1, wherein the skeleton is arranged symmetrically, and the balance component and the welding plate structure are arranged symmetrically with the symmetrical axis of the skeleton; a weight of the balance component is equal to a sum of the weights of the welding plate structure and the lead wire.

9. The micro speaker as described in claim 1, wherein the magnetic circuit system includes a first magnet having a containment groove and accommodated in the containment space, a second magnet fixed to the first magnet and located in the containment groove, and a magnetic gap formed between the second magnet and the first magnet for at least partially receiving the voice coil.

* * * * *